United States Patent
Costecalde et al.

(10) Patent No.: US 9,864,613 B2
(45) Date of Patent: Jan. 9, 2018

(54) CONFIGURATION CHECKER FOR APPLICATION

(71) Applicant: International Business Machines Corporation, Armonk, NY (US)

(72) Inventors: Jean-Marc Costecalde, Irvine, CA (US); Dong Rui Li, Beijing (CN); Chi Minh Nguyen, Irvine, CA (US); Yan Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 257 days.

(21) Appl. No.: 14/676,945

(22) Filed: Apr. 2, 2015

(65) Prior Publication Data
US 2016/0291991 A1 Oct. 6, 2016

(51) Int. Cl.
G06F 15/177 (2006.01)
G06F 9/445 (2006.01)
G06F 9/54 (2006.01)

(52) U.S. Cl.
CPC .......... *G06F 9/44505* (2013.01); *G06F 9/541* (2013.01)

(58) Field of Classification Search
CPC .................................................. G06F 9/44505
See application file for complete search history.

(56) References Cited

U.S. PATENT DOCUMENTS

| 8,195,931 B1 | 6/2012 | Sharma et al. |
| 2005/0066019 A1* | 3/2005 | Egan ............... G06F 8/65 709/223 |
| 2007/0157170 A1 | 7/2007 | Reiss et al. |
| 2010/0042974 A1 | 2/2010 | Gutz et al. |
| 2014/0130020 A1 | 5/2014 | Boshernitsan et al. |

OTHER PUBLICATIONS

Colledge, "Policy-based Management and Central Management Servers"; Simple talk; downloaded from <https://www.simple-talk.com/sql/database-administration/policy-based-management-and-central-management-servers/> on May 2, 2015; Sep. 30, 2010.

\* cited by examiner

*Primary Examiner* — Kim Huynh
*Assistant Examiner* — Eric Chang
(74) *Attorney, Agent, or Firm* — Gates & Cooper LLP

(57) ABSTRACT

Provided are techniques for verifying application compatibility, comprising providing a configuration knowledge server (CKS) to store information about configuration issues; detecting, by a configuration checking agent (CCA), a reconfiguration of a computing system; signaling, by the CCA, a configuration checking service (CCS), in response to the detecting; in response to the signaling, requesting, by the CCS, a compatibility report, from the CKS, about potential configuration issues with respect to the reconfiguration; transmitting the compatibility report from the CKS to the CCS; parsing, by the CCS, the compatibility report to identify a compatibility issue with respect to the reconfiguration; and in response to identifying the compatibility issue, dynamically performing an action to mitigate the compatibility issue.

18 Claims, 9 Drawing Sheets

CONFIGURATION CHECKER FOR APPLICATION

FIELD OF DISCLOSURE

The claimed subject matter relates generally to computing systems and, more specifically, to techniques for automatically validating a new configuration of applications in response to a change in components.

BACKGROUND OF THE INVENTION

Currently, in computing system environments, a typical application depends upon, and integrates with, with different products, including many different components. For example a web application may depend upon a database and a web server. The components that a particular application depends upon, or "base" products and components, may change. Such a change may negatively impact the particular application by lowering its performance or even breaking the functionality of the application. When such an issue occurs, it can be very difficult to identify the cause.

SUMMARY

Provided are techniques for checking, or validating, a specific application configuration when the base products and/or components change. When a configuration changes, a Configuration Checker validates the change with respect to registered components upon which a particular application depends. If a change might cause a known negative effect, the Configuration Checker notifies appropriate parties. If there are no known negative effects, Configuration Checker allows the change and, in addition, the change is recorded in a Configuration Knowledge Database for future reference. Techniques are also provided for the reporting of newly discovered negative effects so that the information is available for subsequent configuration change validations.

Provided are techniques for verifying application compatibility, comprising providing a configuration knowledge server (CKS) to store information about applications, dependencies among the applications, installation references, changes to the applications and issues related to the applications, dependencies among the applications, installation references and changes to the applications; detecting, by a configuration checking agent (CCA), a reconfiguration of a computing system; signaling, by the CCA, a configuration checking service (CCS), in response to the detecting; in response to the signaling, requesting, by the CCS, a compatibility report, from the CKS, about the applications, dependencies among the applications, installation references, changes to the applications and issues related to the applications, dependencies among the applications, installation references and changes to the applications with respect to the reconfiguration; transmitting the compatibility report from the CKS to the CCS; parsing, by the CCS, the compatibility report to identify a compatibility issue with respect to the reconfiguration; and in response to identifying the compatibility issue, dynamically performing an action to mitigate the compatibility issue.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
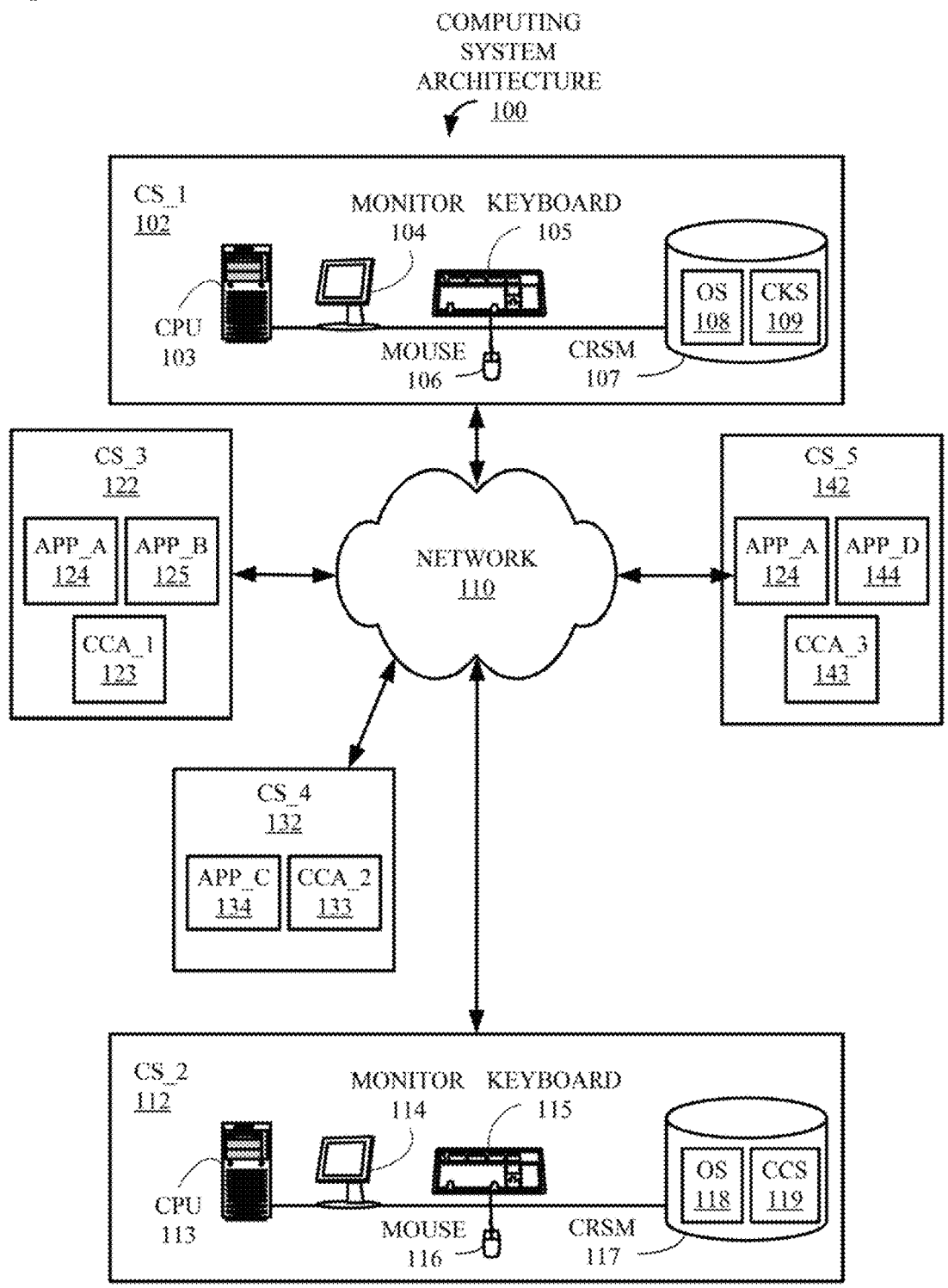
FIG. 1 is one example of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of one example of a computing system architecture 100 that may incorporate the claimed subject matter. It should be noted there are many possible computing system configurations that may implement the disclosed technology, of which computing system architecture 100 is only one simple example.

A computing system, or "CS_1," 102 includes a central processing unit (CPU) 103, coupled to a monitor 104, a keyboard 105 and a pointing device, or "mouse," 106, which together facilitate human interaction with CS_1 102 and other elements of architecture 100. CPU 103 would comprise, among other things, one or more processors. Also included in CS_1 102 and attached to CPU 103 is a computer-readable storage medium (CRSM) 107, which may either be incorporated into CS_1 102 i.e. an internal device, or attached externally to CPU 103 by means of various, commonly available connection devices such as but not limited to, a universal serial bus (USB) port (not shown). CRSM 107 is illustrated storing an operating system (OS) 108 and a Configuration Knowledge Server (CKS) 109, which is described in more detail below in conjunction with FIGS. 2 and 8.

CS_1 102 is communicatively coupled to a network 110. Also coupled to network 110, and thereby able to communicate with CS_1 102 and each other via network 110, are several other computing systems, i.e., a CS_2 112, a CS_3 122, a CS_4 132 and a CS_5 142. In this example, CS_2 112 is also illustrated with a CPU 113, a monitor 114, a keyboard 115, a mouse 116 and a CRSM 117. Like elements 104-106, monitor 114, keyboard 115 and mouse 116 enable human interaction with CS . . . 2 112. CRSM 117 is illustrated storing an OS 118 and a Configuration Checking Server (CCS) 119, which is described in more detail below in conjunction with FIGS. 4 and 7. Although in this example, CSs 102, 112, 122, 132 and 142 are communicatively coupled via network 110, they could also be coupled through any combination of communication mediums such as, but not limited to, a local area network (LAN) (not shown), a wide area network (WAN) and direct wires.

Although not shown for the sake of simplicity, CS_3 122, CS_4 132 and CS_5 142 would also typically include a CPU, monitor, keyboard, mouse and CRSM. CS_3 122, CS_4 132 and CS_5 142 are illustrated storing logic associated with Configuration Checking Agents, i.e., a CCA_1 123, a CCA_2 133 and a CCA_3 143, respectively, which are explained in more detail below in conjunction with FIGS. 5 and 6. CS_3 122 is also illustrated storing logic associated with two applications, i.e., an APP_A 124 and an APP_B 125. CS_4 132 is illustrated storing logic associated with an application, or APP_C 134. CS_5 142 is illustrated storing logic associated with two applications, i.e., an APP_A 124 and an APP_D 144. It should be noted that both CS_3 122 and CS_5 142 store logic associated with APP_A 124. Logic associated with CCAs 123, 133 and 143 and applications 124, 125, 134 and 144 is typically stored on CRSMs (not shown) of the corresponding devices and executed on one or more processors (not shown) of the corresponding CPUs (not shown).

Figure 2:
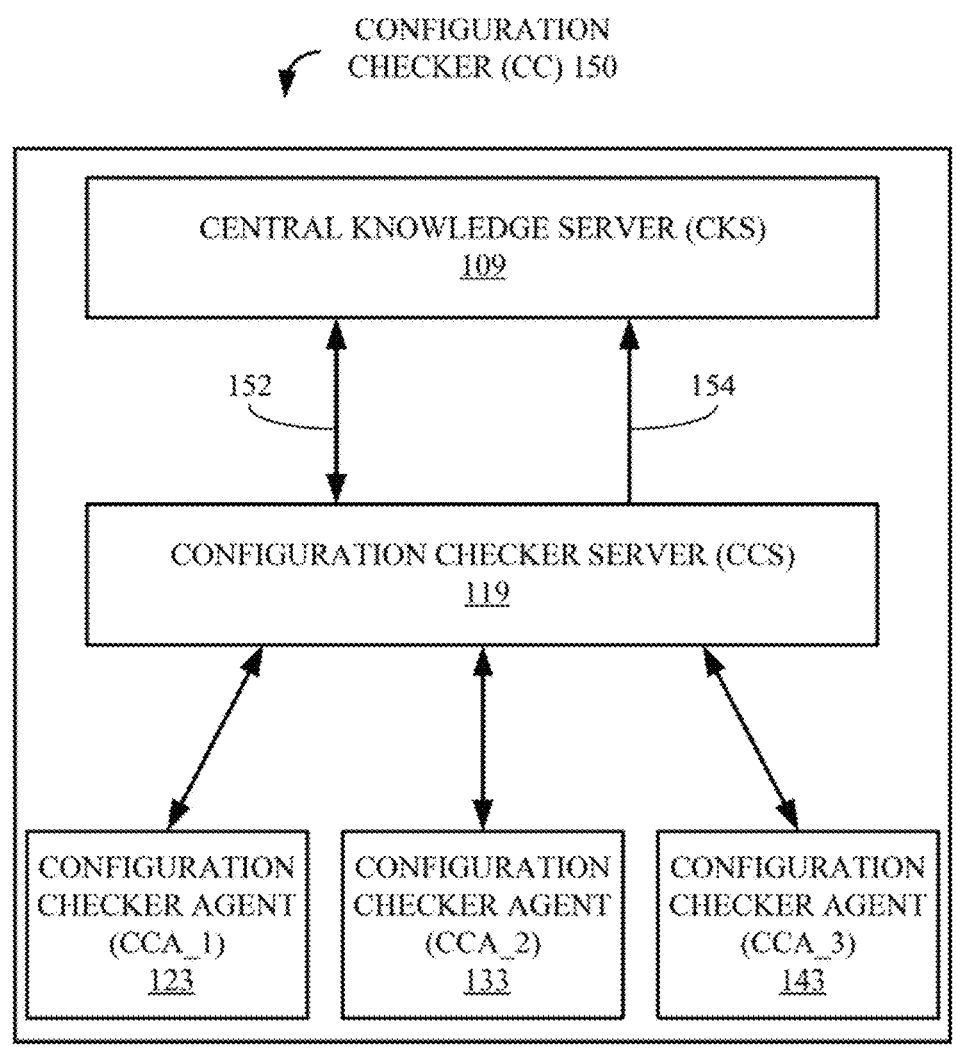
FIG. 2 is a block diagram of a Configuration Checker (CC) that may implement aspects of the claimed subject matter.

FIG. 2 is a block diagram of a Configuration Checker (CC) 150 that may implement aspects of the claimed subject matter. CC 150 includes CKS 109 (FIG. 1), CCS 119 (FIG. 1). CCA_1 123, CCA_2 133 and CCA_3 143. It should be understood that CC 150 is merely one example and that any particular CC may include multiple CCSs, each responsible for multiple CCAs. CCAs 123, 133 and 143 transmit and receive messages form CCS 119, which in turn transmits and received messages from CKS 109. The particular messages transmitting and received between CCAs 123, 133 and 143 and CCS 119 and between CCS 119 and CKS 109 are explained in more detail below in conjunction with FIGS. 6-9. Two specific types of communications between CCS 119 and CKS 109 represented in FIG. 2 are requests for information on specific configuration changes and responses to the request, represented by a line 152 and updates from CCS 119 to CKS 109 on new information typically concerning previously unknown adverse effects of updates and configuration changes on applications, represented by a line 154.

Figure 3:
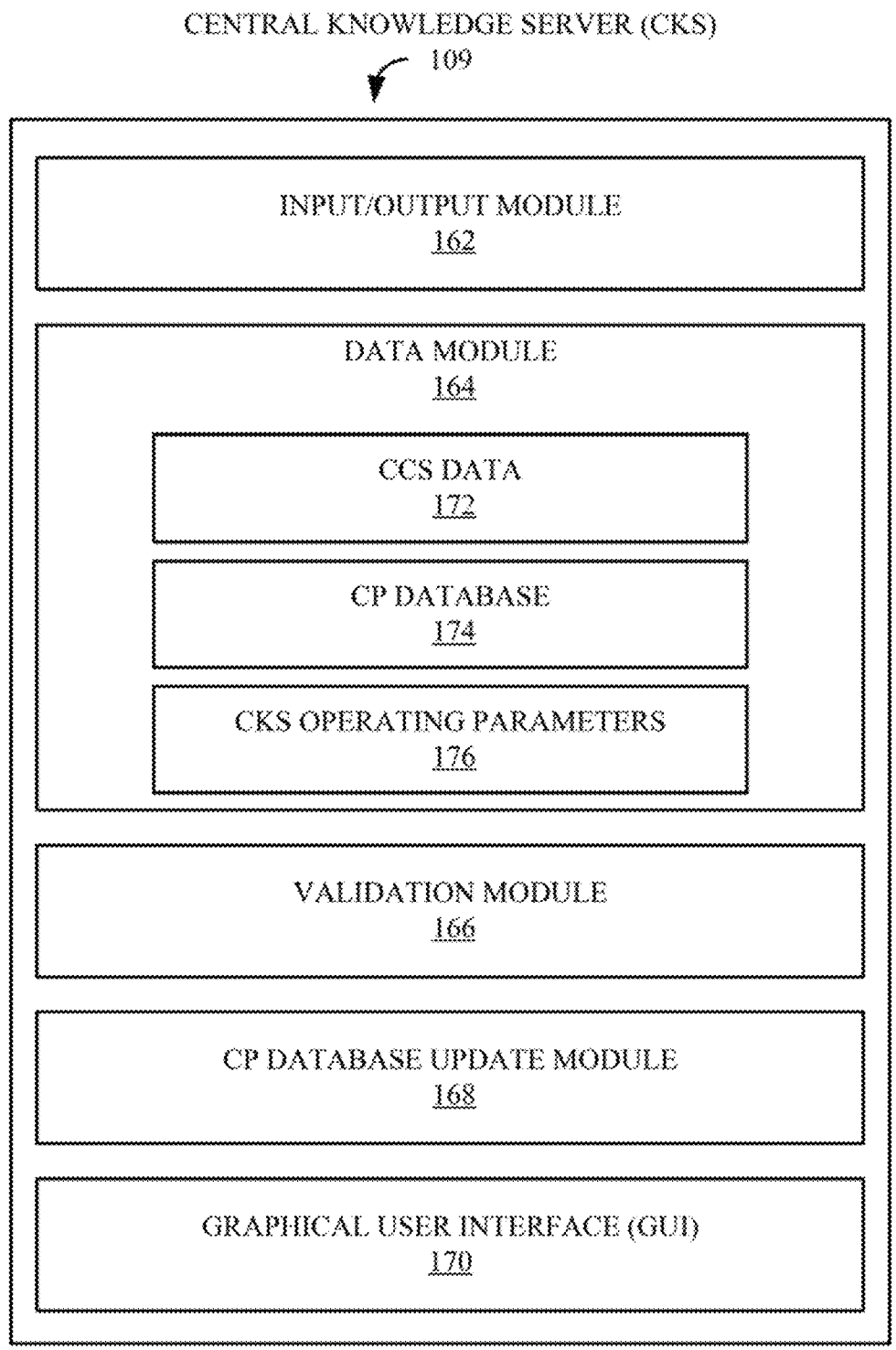
FIG. 3 is a block diagram a Central Knowledge Server (CKS) that may implement aspects of the claimed subject matter.

FIG. 3 is a block diagram Central Knowledge Server (CKS) 109, first introduces above in conjunction with FIGS. 1 and 2, in greater detail. CKS 109 includes an input/output (I/O) module 162, a data module 164, a validation module 166, a Configuration Problem (CP) Database Update module 168 and a graphical user interface (GUI) module, or simply "GUI," 170. For the sake of the following examples, logic associated with CKS 109 is assumed to be stored in CRSM 107 (FIG. 1) and execute on one or more processors (not shown) of CPU 103 (FIG. 1) of CS_1 102 (FIG. 1). It should be understood that the claimed subject matter can be implemented in many types of computing systems and data storage structures but, for the sake of simplicity, is described only in terms of CS_1 102 and system architecture 100 (FIG. 1). Further, the representation of CKS 109 in FIG. 3 is a logical model. In other words, components 162, 164, 166, 168 and 170 may be stored in the same or separates files and loaded and/or executed within system 100 either as a single system or as separate processes interacting via any available inter process communication (IPC) techniques.

I/O module 162 handles any communication CKS 109 has with other components of system 100, including CCS 119 (FIGS. 1 and 2). Data module 164 is a data repository for information that CKS 109 requires during normal operation. Examples of the types of information stored in data module 164 include CCS data 172, a Configuration Problem (CP) database 174 and CKS operating parameters 176. CCS data 172 stores information that enables CKS 109 to receive signals from and respond to suitably configured Configuration Checker Servers (CCSs) such as CCS 119. Examples of such information may include, but is not limited to, communication address and protocols, APIs and data on the environment of a particular CCSs. CP database 174 stores information on all know registered applications and any problems, known or reported, for those applications. For example, known problems may include known conflicts among different versions of components. CKS operating parameters 176 stores parameters that control the look, feel, administrative preferences and operation of CKS 109. Typically, such parameters are set by an administrator employing GUI 170.

Validation module 166 correlates reported configuration changes (see 338, FIGS. 7 and 364, FIG. 8) with CP database 174 to identify any known or reported issues corresponding to the configuration change. CP Database Update module 168 is responsible for handling the formatting and insertion of reported issues (see 380, FIG. 9) into CP database 174. GUI 170 enables administrators of CKS 109 to interact with and to define the desired functionality of CKS 109, typically by the setting of parameters in CKS operating parameters 176. Components 162, 164, 166 and 168 are described in more detail below in conjunction with FIGS. 4-9.

Figure 4:
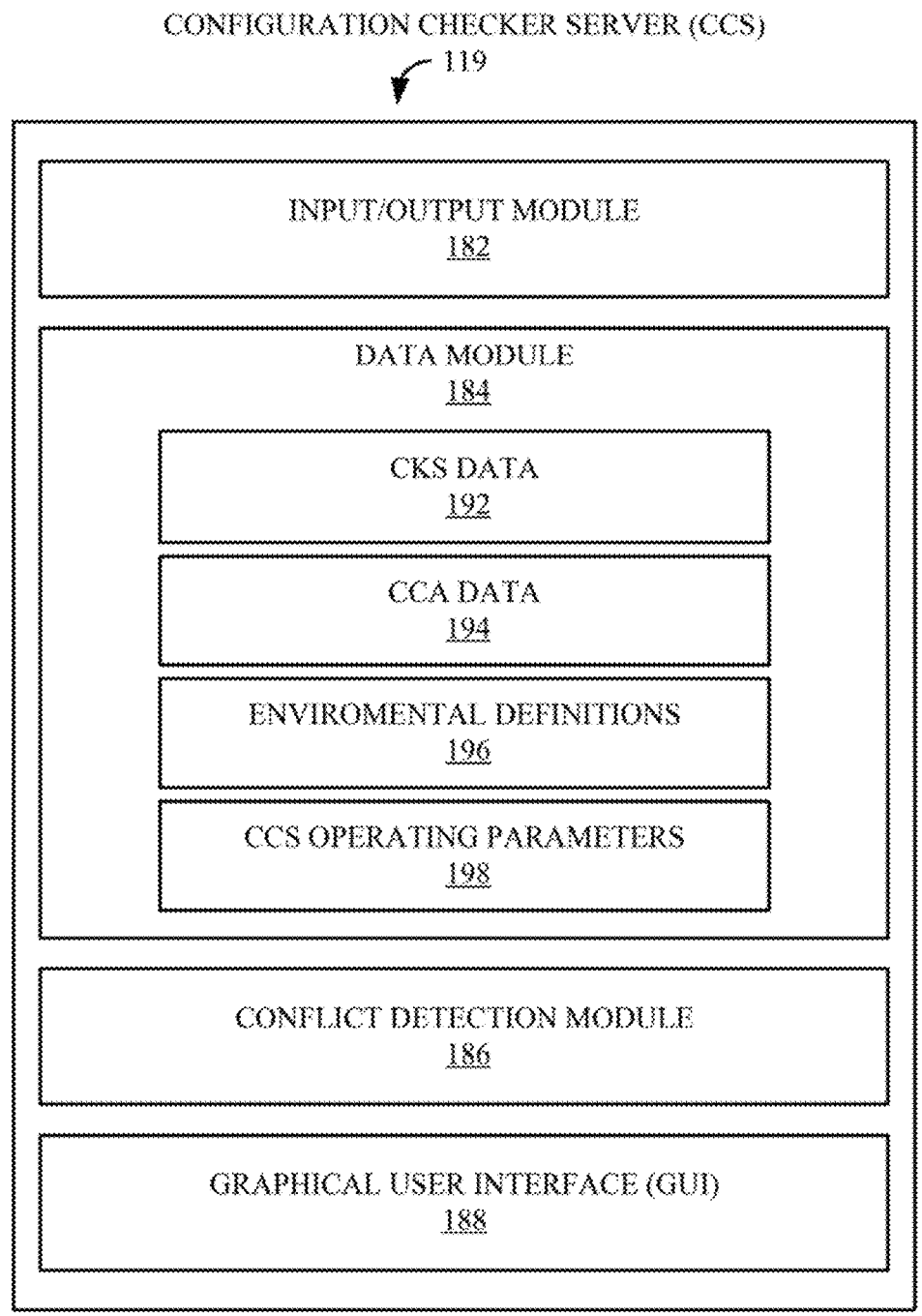
FIG. 4 is a block diagram of a Configuration Checker Server (CCS) that may implement aspects of the claimed subject matter.

FIG. 4 is a block diagram of Configuration Checker Server (CCS) 119, first introduces above in conjunction with FIGS. 1 and 2, in greater detail. CCS 119 includes an input/output (I/O) module 182, a data module 184, a conflict detection module 186 and a graphical user interface (GUI) module, or simply "GUI," 188. For the sake of the following examples, logic associated with CCS 119 is assumed to be stored in CRSM 117 (FIG. 1) and execute on one or more processors (not shown) of CPU 113 (FIG. 1) of CS_2 112 (FIG. 1). It should be understood that the claimed subject matter can be implemented in many types of computing systems and data storage structures but, for the sake of simplicity, is described only in terms of CS_2 112 and system architecture 100 (FIG. 1). Further, the representation of CCS 119 in FIG. 4 is a logical model. In other words, components 182, 184, 186 and 188 may be stored in the same or separates files and loaded and/or executed within system 100 either as a single system or as separate processes interacting via any available inter process communication (IPC) techniques.

I/O module 182 handles any communication CCS 119 has with other components of system 100, including CKS 109 (FIGS. 1-3) and CCAs 123, 133 and 143 (FIGS. 1 and 2). Data module 184 is a data repository for information that CCS 119 requires during normal operation. Examples of the types of information stored in data module 184 include CKS data 192, CCA data 194, Environmental Definitions 196 and CCS operating parameters 198.

CKS data 192 stores information that enables CCS 119 to receive signals from and respond to a suitably configured Configuration Knowledge Server (CKS) such as, in this example, CKS 109 (FIGS. 1-3). Examples of such information may include, but is not limited to, communication address and protocols and application programming interfaces (APIs) of CKS 109. CCA data 194 stores information on all know and suitably configured and registered CCAs such as CCA_1 123, CCA_2 133 and CCA_3 143. Examples of such information may include, but is not limited to, communication address and protocols and APIs of CCAs 123, 133 and 143. Environmental Definitions 196 stores information detailing groups of applications and products that integrate with one another to run an application, i.e., what the applications and products, where they are and any dependencies. Environmental definitions 196 also includes a history of changes corresponding to each registered CCA 123, 133 and 143. CCS operating parameters 198 stores parameters that control the look, feel, administrative preferences and operation of CCS 119. Typically, such parameters are set by an administrator employing GUI 188.

Conflict Detection module 186 is responsible for determining whether or not a changes detected by CCAs 123, 133 and 143 (see 304, FIG. 6) are known to cause any issues. In addition, Conflict Detection module 186 is responsible for notifying CCAs 123, 133 and 143 in the event an issue is detected (see 344, FIG. 7). GUI 188 enables administrators of CCS 119 to interact with and to define the desired functionality of CCS 119, typically by the setting of parameters in CCS operating parameters 198. Components 182, 184 and 186 are described in more detail below in conjunction with FIGS. 5-9.

Figure 5:
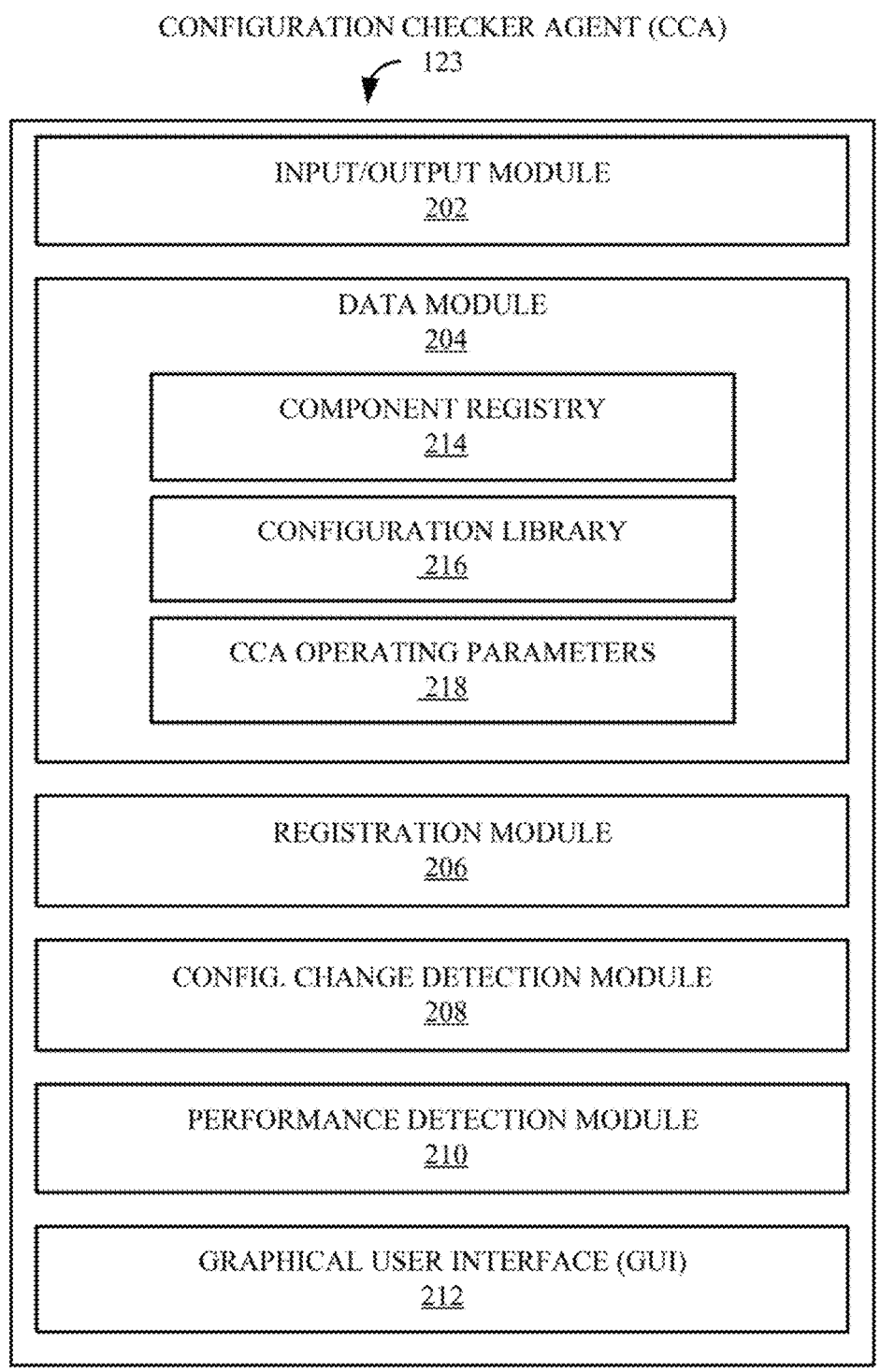
FIG. 5 is a block diagram of a Configuration Checker Agent (CCA) that may implement aspects of the claimed subject matter.

FIG. 5 is a block diagram of a Configuration Checker Agent, which in this example is CCA_1 123, first introduced above in conjunction with FIGS. 1 and 2, in greater detail. CCA_1 123 includes an input/output (I/O) module 202, a data module 204, a registration module 206, a Configuration Change Detection module 208, a Performance Detection module 210 and a graphical user interface (GUI) module, or simply "GUI," 212. For the sake of the following examples, logic associated with CCA_1 123 is assumed to be stored in a CRSM (not shown) of CS_3 122 (FIG. 1) and execute on one or more processors (not shown) of a CPU (not shown) of CS_3 122. It should be understood that the claimed subject matter can be implemented in many types of computing systems and data storage structures but, for the sake of simplicity, is described only in terms of CS_3 122 and system architecture 100 (FIG. 1). Further, the representation of CCA_1 123 in FIG. 5 is a logical model. In other words, components 202, 204, 206, 208, 210 and 212 may be stored in the same or separates files and loaded and/or executed within system 100 either as a single system or as separate processes interacting via any available inter process communication (IPC) techniques.

I/O module 202 handles any communication CCA_1 123 has with other components of system 100, including CCS 119 (FIGS. 1, 2 and 4). Data module 204 is a data repository for information that CCA_1 123 requires during normal operation. Examples of the types of information stored in data module 204 include a component registry 214, a configuration library 216 and CCA operating parameters 218.

Component Registry 214 stores information on components, which in this example are components on CS_3 122 that are registered to take advantage of the provided configuration checking service of CC 150 (FIG. 2). In the following example, registered components of CS_3 123 include App_A 124 (FIG. 1) and App_B 125 (FIG. 1). As described in more detail below, components may be manually registered by a user or administrator of CS_3 122 or come "Configuration Checker ready," which implies that the component automatically registers itself when installed. Examples of stored component information include, but are not limited to, the type and version of a component, communication ports and protocols and APIs. Configuration Library 216 stores information concerning the current and previous configurations of components referenced in component registry 214. In other words, configuration library 216 stores information on configurations and configuration changes that have been previously implemented on registered components. CCA operating parameters 218 stores parameters that control the look, feel, administrative preferences and operation of CCA 123. Typically, such parameters are set by an administrator employing GUI 212.

Registration module 206 is responsible for implementing a registration procedure for components. Typically, a particular component is registered when information corresponding to the component is entered into Component registry 214. Such information may be entered by an administrator or collected from an external source (not shown). For example, information concerning different applications and other types of components may be available over the Internet (not shown) from manufacturers, vendors or publically information repositories. In addition, as mentioned above, components may be either manually registered or "configuration checker ready."

Figure 6:
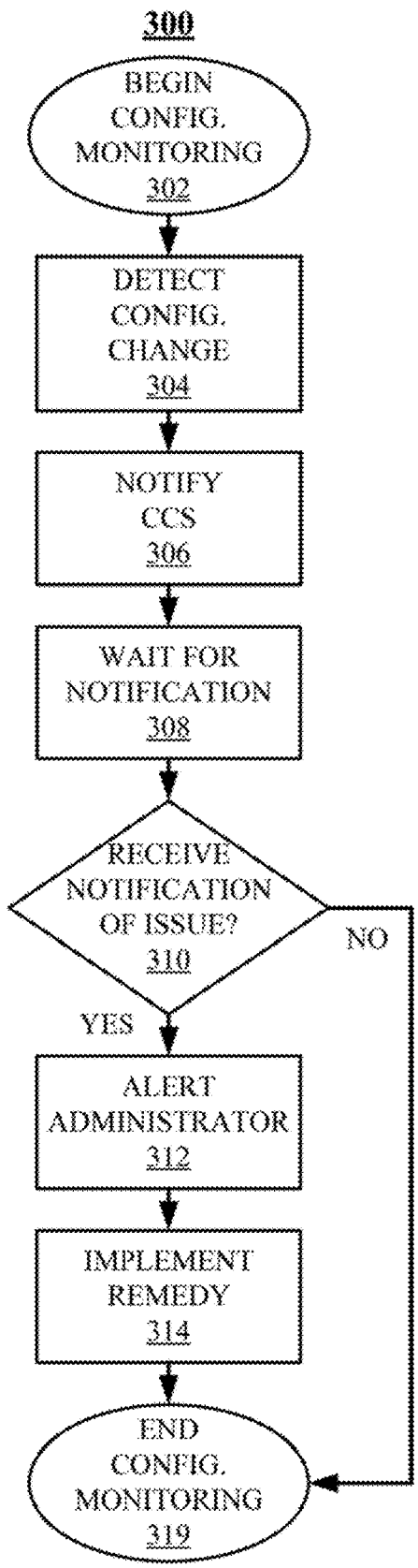
FIG. 6 is an example of a flowchart of a Configuration Monitoring process that may implement aspects of the claimed subject matter.

Configuration Change Detection module 208 is responsible for detecting a change in the configuration of any registered components or components upon which registered components may depend (see 304, FIG. 6). Performance Detection module 210 is responsible for detecting significant changes in the performance of CS_3 122. In such a case, CC 150 may implement a check off all affected components to determine if any configuration issues have arisen. GUI 212 enables administrators of CCA_1 123 to interact with and to define the desired functionality of CCA_1 123, typically by the setting of parameters in CCA operating parameters 218. Components 202, 206, 208 and 210 are described in more detail below in conjunction with FIGS. 6-9.

FIG. 6 is a flowchart of an example of a Configuration Monitoring process 300 that may implement aspects of the claimed subject matter. In the following example, logic associated with process 300 is stored in a CRSM (not shown) of CS 0.3 122 (FIG. 1) in conjunction with CCA_1 123 (FIGS. 1, 2 and 5) and executed on one or more processors (not shown) of a CPU (not shown) of CS_3 122. Typically, similar processes would be executing on CA_4 132 (FIG. 1) and CS_5 142 (FIG. 1) in conjunction with CCA_2 133 and CCA_3 143, respectively.

Process 300 starts in a "Begin Configuration (Config.) Monitoring" block 302 and proceeds immediately to a "Detect Config. Change" block 304. During processing associated with block 304, a change in the configuration of CS_3 122 is detected by CCA_1 123. Such a change may be, but is not limited to, new or updated hardware or software, a changed configuration or any combination of changes. During processing associated with a "Notify CCS" block 306, CCA_1 123 signals CCS 119 (FIGS. 1, 2 and 4) that a configuration change has been detected and includes in conjunction with the signal details of the change, e.g., a particular software component has been replaced with a different version or product.

During processing associated with a "Wait for Notification" block 308. CCA_1 123 waits for a response (see 344, FIG. 7) from CCS 119 with respect to the signal, or notification, transmitted in conjunction with block 306. During processing associated with a "Receive Notification of Issue?" block 310, a determination is made as to whether or not CCS 119 has responded to the signal transmitted during processing associated with block 306 with an indication that a configuration issue has been detected. It should be noted that process 300 may be configured to either receive a signal indicating "No Issue" or for CCA_1 123 to "timeout" if no notification is received. Whether or not to timeout and the specific length of time may be set by an administrator by setting a parameter of CCA operating parameters 218 (FIG. 5).

In response to a notification of an issue, control proceeds to an "Alert Administrator" block 312. During processing associated with block 312, an appropriate message is transmitted to a party responsible for implementing the reconfiguration of CS_3 122. During processing associated with an "Implement Remedy" block 314, the responsible party may make changes to the reconfiguration. Typically, such changes would be detected by CCA_1 123 and process 300 would be executed again to validate the changes. Finally, if either a notification of No Issue is received or a timeout has occurred during processing associated with block 310, or a remedy has been implemented during processing associated with block 314, control proceeds to an "End Config. Monitoring" block 319 and process 300 is complete.

Figure 7:
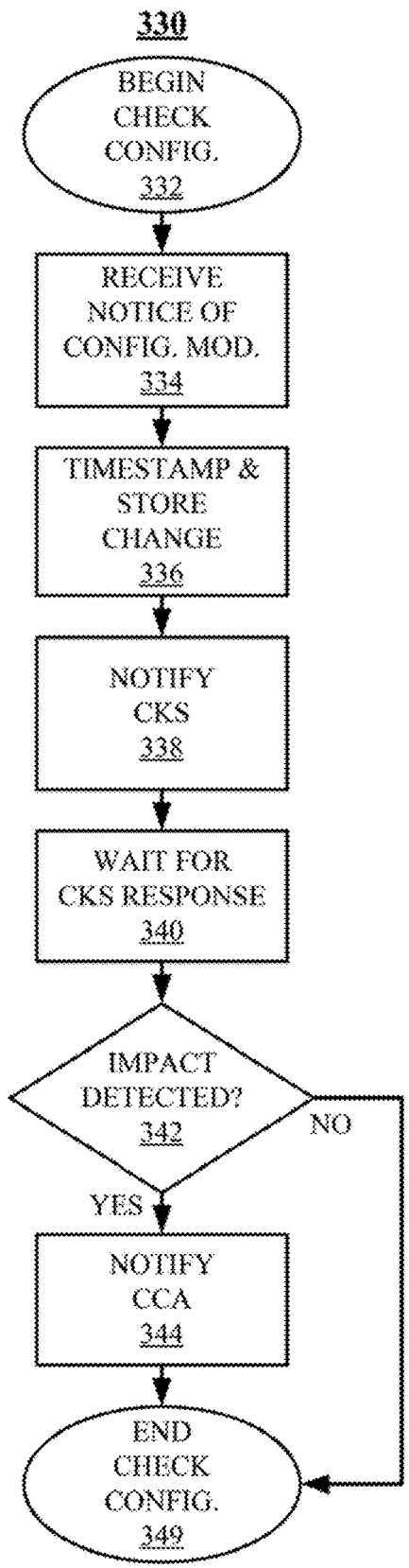
FIG. 7 is an example of a flowchart of a Check Configuration process that may implement aspects of the claimed subject matter.

FIG. 7 is a flowchart of an example of a Check Configuration process 330 that may implement aspects of the claimed subject matter. In the following example, logic associated with process 330 is stored in CRSM 117 (FIG. 1) of CS_2 112 (FIG. 1) in conjunction with CCS 119 (FIGS. 1, 2 and 4) and executed on one or more processors (not shown) of CPU 113 (FIG. 1) of CS_2 112.

Process 330 starts in a "Begin Check Configuration (Config.)" block 332 and proceeds immediately to a "Receive Notice of Config. Modification (Mod.)" block 334. During processing associated with block 334, CCS 119 receives a signal (see 306, FIG. 6) from, in this example CCA_1 123 (FIGS. 1, 2 and 5), indicating that a change in configuration has been detected (see 304, FIG. 6) on CS_3 122 (FIG. 1). During processing associated with a "Timestamp and Store Change" block 336, information about the specific reconfiguration on CS_3 122 and the time of the notification are stored in CCA data 194 (FIG. 4) of data module 184 (FIG. 4) for future reference.

During processing associated with a "Notify CKS" block 338, CCS 119 transmits a request for a configuration check to CKS 109 (FIGS. 1-3). Such a request includes details of the potential reconfiguration and current setup of CS_3 122. During processing associated with a "Wait for CKS Response" block 340, CCS 119 waits for CKS to analyze the information transmitted during processing associated with block 338 and identify any potential issues (see 360, FIG. 8). During processing associated with an "Impact Detected?" block 342, either a report is received from CKS 109 or, if so configured, a timeout occurs. A determination is made, based upon the report as to whether or not a negative impact, or issue, has been detected. If so, CCS 119 notifies CCA_1 123 (see 308. FIG. 6) during processing associated with a "Notify CCA" block 344. Finally, once CCA_1 123 has been notified during processing associated with block 344 or either a No issue report or timeout has occurred in conjunction with block 342, control proceeds to an "End Check Config." block 349 and process 330 is complete.

Figure 8:
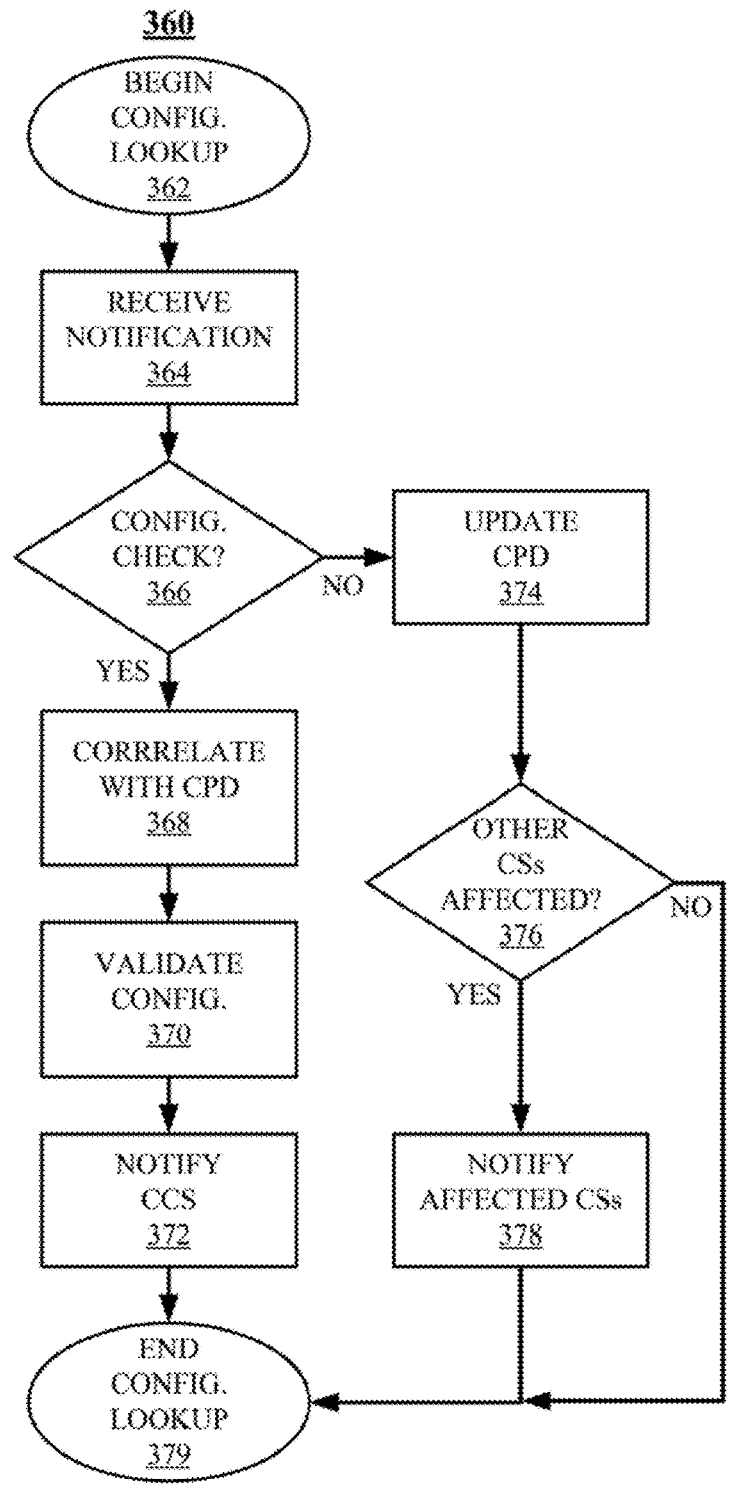
FIG. 8 is an example of a flowchart of Configuration Lookup process that may implement aspects of the claimed subject matter.

FIG. 8 is a flowchart of an example of a Configuration Lookup process 360 that may implement aspects of the claimed subject matter. In the following example, logic associated with process 360 is stored on CRSM 107 (FIG. 1) of CS_1 102 (FIG. 1) in conjunction with CKS 109 (FIGS. 1-3) and executed on one or more processors (not shown) of CPU 103 (FIG. 1) of CS_1 102.

Process 360 starts in a "Begin Configuration (Config.) Lookup" block 362 and proceeds immediately to a "Receive Notification" block 364. During processing associated with block 364, CKS 109 receives a message from CCS 119 (FIGS. 1, 2 and 4) (see 338, FIG. 7). During processing associated with a "Config. Check?" block 366, a determination is made as to whether or not the message concerns a change in configuration on CS_3 122 (FIG. 1). (see 304, FIG. 6) or a notification of a newly discovered configuration issue (see 380, FIG. 9). If the message concerns a configuration change, control proceeds to "Correlate with CPD" block 368. During processing associated with block 368, the information received during processing associated with block 364 is correlated with CP database 174 (FIG. 3) to identify any known issues. During processing associated with a "Validate Config." block 370, the data gathered during processing associated with block 368 is examined (see 166, FIG. 3) to determine whether or not the proposed reconfiguration of CS_3 122 presents any issues. Once the reconfiguration has been either validated or not, CKS 109 transmits a report on the findings to CCS 119 (see 340, FIG. 7) during processing associated with a "Notify CCS" block 372.

If a determination is made during processing associated with block 366 that the notification received during processing associated with block 364 is not a request for a reconfiguration validation, control proceeds to an "Update CPD" block 374. Typically, if the notification is not a validation request, the notification is related to a newly discovered configuration issue (see 380, FIG. 9). The newly discovered configuration issue is then stored in CPD 174 so that future validation requests can be made aware of the issue.

During processing associated with an "Other CS's Affected?" block 376, a determination is made as to whether or not CSs other than CS_1 122, such as CS_4 132 (FIG. 1) or CS_5 142 (FIG. 1), may have similar configuration issues related to the newly reported issue. If so, control proceeds to a "Notify Affected CSs" block 378 during which the affected CSs are notified. Typically, the notification would be transmitted to CCS 119, which would then forward the information to the appropriate CCAs.

Finally, once CCS 119 has been notified during processing associated with block 372, CCAs have been notified during processing associated with block 378 or a determination is made during processing associated with block 376 that other CSs are not affected, control proceeds to an "End Config. Lookup" block 379 and process 360 is complete.

Figure 9:
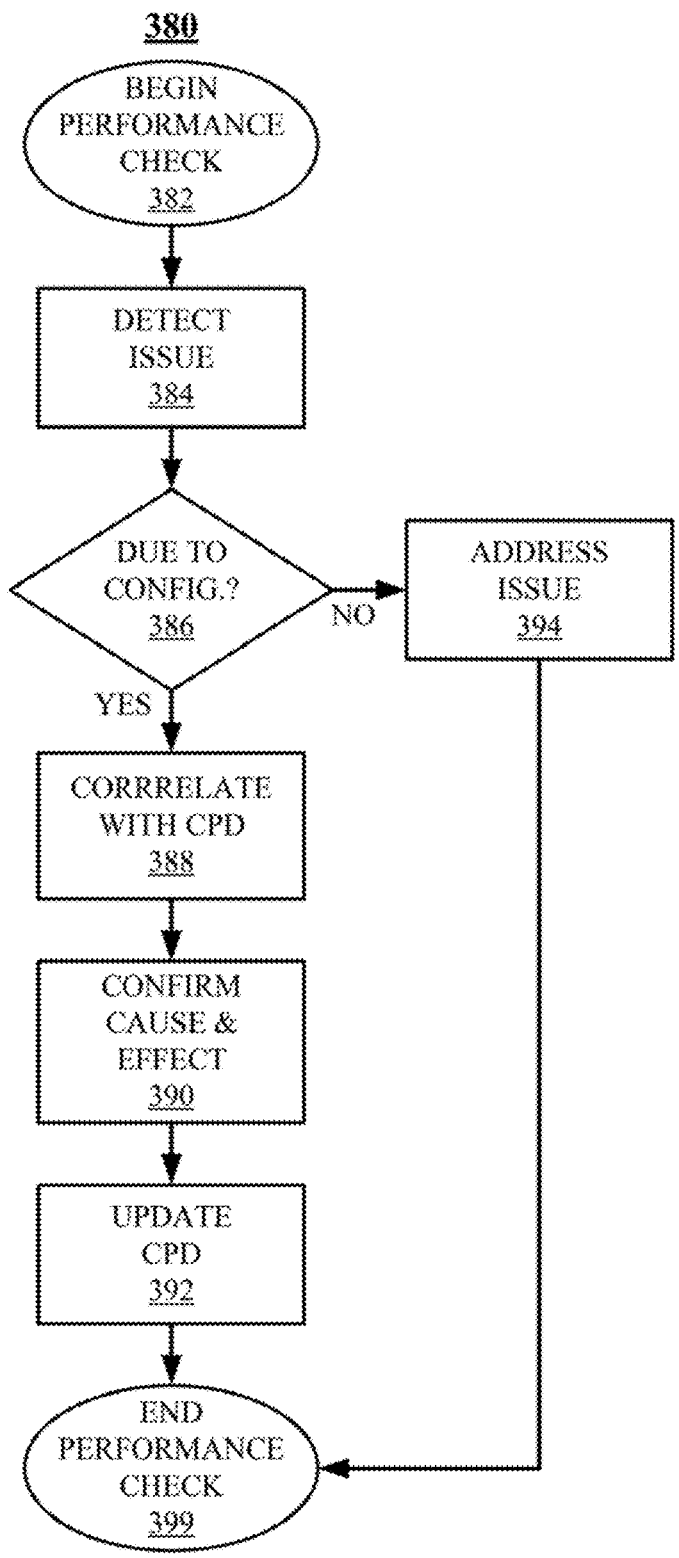
FIG. 9 is an example of a flowchart of Performance Check process that may implement aspects of the claimed subject matter.

FIG. 9 is a flowchart of an example of a Performance Check process 380 that may implement aspects of the claimed subject matter. In the following example, logic associated with process 380 is stored in a CRSM (not shown) of CS_3 122 (FIG. 1) in conjunction with CCA_1 123 (FIGS. 1, 2 and 5) and executed on one or more processors (not shown) of a CPU (not shown) of CS_3 122. Typically, similar processes would be executing on CA_4 132 (FIG. 1) and CS_5 142 (FIG. 1) in conjunction with CCA_2 133 and CCA_3 143, respectively.

Process 380 starts in a "Begin Performance Check" block 382 and proceeds immediately to a "Detect Issue" block 384. During processing associated with block 384, CCA_1 123 scans CS_3 122 to determine if any performance issues have occurred. Such issues may be detected by such activities, but not limited to, examining error logs and analyzing performance metrics related to the components of CS_1 122. During processing associated with "Due to Configuration?" block 386, a determination is made as to whether or not the issue detected during processing associated with block 384 is related to a configuration or reconfiguration of CS_1 122. If so, control proceeds to a "Correlate With CPD" block 388 during which CP database 174 (FIG. 3) is consulted to determine whether or not the issue is currently known. In one embodiment, such as request would be handled either by means of an application programming interface (API) provided by either CKS 109 (FIGS. 1-3) or CCS 119 (FIGS. 1, 2 and 4), which would call an API on CKS 109.

During processing associated with a "Confirm Cause and Effect" block 390, a determination is made as to the particular cause of the problem and, during processing associated with an "Update CPD," a signal is transmitted (see 366, 374, FIG. 8) to CKS 109 to update CPD 174.

If, during processing associated with block 386, a determination is made that the issue detected during processing associated with block 384 is not related to a configuration or reconfiguration, control proceeds to an "Address Issue" block 394 during which a system administrator would typically be notified and, if possible, address the issue. Finally, once CPD 174 has been updated during processing associated with block 392 or the detected issue has been addressed during processing associated with block 394, control proceeds to an "End Performance Check" block 399 and process 380 is complete. In this manner, CPD 174 may be maintained in a manner such issues are up to date for all systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for verifying application compatibility, comprising:
    providing a configuration knowledge server (CKS) to store configuration information;
    detecting, by a configuration checking agent (CCA), a reconfiguration or a performance issue of a first computing system;
    signaling, by the CCA, a configuration checking service (CCS), in response to the detecting;
    in response to the signaling, requesting, by the CCS, a compatibility report, from the CKS, about configuration information with respect to the reconfiguration or the performance issue;
    transmitting the compatibility report from the CKS to the CCS;
    parsing, by the CCS, the compatibility report to identify a compatibility issue with respect to the reconfiguration or the performance issue;
    in response to the identifying of the compatibility issue, dynamically performing an action to mitigate the compatibility issue, wherein the action includes:
    determining that a second computing system has a potential issue raised by the configuration information; and
    signaling the second computing system of the potential issue.

2. The method of claim 1, wherein the configuration information comprises:
    information about applications;
    issues related to the applications;
    dependencies among the applications;
    installation references; and
    changes to the applications.

3. The method of claim 1, further comprising:
    detecting, by the CCA, a performance issue on the first computing system;
    determining that the performance issue is related to a configuration of the first computing system; and
    updating the configuration information with respect to the performance issue to produce updated configuration information in response to the determining that the performance issue is related.

4. The method of claim 3, wherein the updated configuration information is employed by the CKS to generate a subsequent compatibility report.

5. The method of claim 1, wherein the request by the CCS to the CKS is via an application programming interface (API) provided by the CKS.

6. The method of claim 1, wherein the signaling by the CCA to the CCS is via an application programming interface (API) provided by the CCS.

7. An apparatus, comprising:
    a configuration checking agent (CCA) comprising first logic, stored on a first non-transitory computer-readable storage medium and executed on a first plurality of processors, for:
    detecting a reconfiguration or a performance issue of a first computing system; and
    signaling a configuration checking service (CCS), in response to the detecting;
    the CCS comprising second logic, stored on a second non-transitory computer-readable storage medium and executed on a second plurality of processors, for:
    requesting, in response to the signaling, a compatibility report, from a configuration knowledge server (CKS), about configuration information with respect to the reconfiguration or the performance issue; and
    parsing the compatibility report to identify a compatibility issue with respect to the reconfiguration or the performance issue;
    in response to identifying the compatibility issue, dynamically performing an action to mitigate the compatibility issue, wherein the action includes:
    determining that a second computing system has a potential issue raised by the configuration information; and
    signaling the second computing system of the potential issue;
    the CKS comprising third logic, stored on a third non-transitory computer-readable storage medium and executed on a third plurality of processors, for:
    generating the compatibility report based upon the configuration information; and
    transmitting the compatibility report from the CKS to the CCS.

8. The apparatus of claim 7, wherein the configuration information comprises:
    information about applications;
    issues related to the applications;
    dependencies among the applications;
    installation references; and
    changes to the applications.

9. The apparatus of claim 7, the first logic further comprising logic for:
   detecting a performance issue on the first computing system;
   determining that the performance issue is related to a configuration of the first computing system; and
   updating the configuration information with respect to the performance issue to produce updated configuration information in response to the determining that the performance issue is related.

10. The apparatus of claim 9, wherein the updated configuration information is employed by the CKS to produce a subsequent compatibility report.

11. The apparatus of claim 7, wherein the requesting by the CCS to the CKS is via an application programming interface (API) provided by the CKS.

12. The apparatus of claim 7, wherein the signaling by the CCA to the CCS is via an application programming interface (API) provided by the CCS.

13. A computer programming product for validating a reconfiguration of a first computing system comprising a non-transitory computer-readable storage medium having program code embodied therewith, the program code executable by a plurality of processors to perform a method comprising:
   providing a configuration knowledge server (CKS) to store configuration information;
   detecting, by a configuration checking agent (CCA), a reconfiguration or a performance issue of the first computing system;
   signaling, by the CCA, a configuration checking service (CCS), in response to the detecting;
   in response to the signaling, requesting, by the CCS, a compatibility report, from the CKS, about configuration information with respect to the reconfiguration or the performance issue;
   transmitting the compatibility report from the CKS to the CCS;
   parsing, by the CCS, the compatibility report to identify a compatibility issue with respect to the reconfiguration or the performance issue;
   in response to the identifying of the compatibility issue, dynamically performing an action to mitigate the compatibility issue, wherein the action includes:
   determining that a second computing system has a potential issue raised by the configuration information; and
   signaling the second computing system of the potential issue.

14. The computer programming product of claim 13, wherein the configuration information comprises:
   information about applications;
   issues related to the applications;
   dependencies among the applications;
   installation references; and
   changes to the applications.

15. The computer programming product of claim 13, the method further comprising:
   detecting, by the CCA, a performance issue on the first computing system;
   determining that the performance issue is related to a configuration of the first computing system; and
   updating the configuration information with respect to the performance issue to produce updated configuration information in response to the determining that the performance issue is related.

16. The computer programming product of claim 15, wherein the updated configuration information is employed by the CKS to produce a subsequent compatibility report.

17. The computer programming product of claim 13, wherein the request by the CCS to the CKS is via an application programming interface (API) provided by the CKS.

18. The computer programming product of claim 13, wherein the signaling by the CCA to the CCS is via an application programming interface (API) provided by the CCS.

* * * * *